US011362839B2

(12) United States Patent
Bott et al.

(10) Patent No.: US 11,362,839 B2
(45) Date of Patent: Jun. 14, 2022

(54) SECURITY DATA PROCESSING DEVICE

(71) Applicant: Secure Thingz Limited, Cambridge (GB)

(72) Inventors: Andrew Bott, Cambridge (GB); Timothy John Woodruff, Cambridge (GB)

(73) Assignee: Secure Thingz Limited, Cambridge (GB)

( * ) Notice: Subject to any disclaimer, the term of this patent is extended or adjusted under 35 U.S.C. 154(b) by 155 days.

(21) Appl. No.: 16/784,468

(22) Filed: Feb. 7, 2020

(65) Prior Publication Data

US 2020/0274716 A1    Aug. 27, 2020

(30) Foreign Application Priority Data

Feb. 22, 2019   (GB) ..................................... 1902469

(51) Int. Cl.
| | |
|---|---|
| *H04L 9/32* | (2006.01) |
| *H04L 9/08* | (2006.01) |
| *G06F 21/57* | (2013.01) |
| *G06F 21/71* | (2013.01) |

(Continued)

(52) U.S. Cl.
CPC ............ *H04L 9/3247* (2013.01); *H04L 9/088* (2013.01)

(58) Field of Classification Search
CPC ....... H04L 9/3247; H04L 9/088; G06F 21/57; G06F 21/71; G06F 21/572; G06F 21/602; G06F 21/64
See application file for complete search history.

(56) References Cited

U.S. PATENT DOCUMENTS

| | | | |
|---|---|---|---|
| 9,081,963 B1* | 7/2015 | Sima ....................... | G06F 21/76 |
| 2011/0010720 A1 | 1/2011 | Smith et al. | |

(Continued)

OTHER PUBLICATIONS

European Extended Search Report for EP Application No. 20156237.8, dated Jun. 25, 2020.

(Continued)

*Primary Examiner* — Vu V Tran
(74) *Attorney, Agent, or Firm* — Hamilton, Brook, Smith & Reynolds, P.C.

(57) ABSTRACT

A security data processing device comprising a processor and memory, the processor configured to: receive a digital document comprising a primary programming requirement for programming a programmable device; determine if there is a record stored in the memory that corresponds to the digital document; receive a programming request from a programming module of a programming machine in communication with said processor, said programming request requesting the programming of the programmable device; determine if the programming request complies with the primary programming requirement in the digital document; and wherein if said programming request complies with the primary programming requirement in the digital document and if there is no record stored in the memory that corresponds to the digital document, the processor is configured to: output programming information to the programming module for programming the programmable device; and permanently store a further record, corresponding to said digital document, in the memory.

20 Claims, 7 Drawing Sheets

(51) Int. Cl.
*G06F 21/60* (2013.01)
*G06F 21/64* (2013.01)

(56) References Cited

U.S. PATENT DOCUMENTS

| | | | |
|---|---|---|---|
| 2013/0086385 A1* | 4/2013 | Poeluev | H04L 9/0838 |
| | | | 726/19 |
| 2014/0344585 A1* | 11/2014 | Hussain | G06F 21/31 |
| | | | 713/191 |
| 2015/0381368 A1 | 12/2015 | Stevens, Jr. et al. | |
| 2017/0048070 A1* | 2/2017 | Gulati | G06F 21/73 |
| 2018/0041341 A1* | 2/2018 | Gulati | G06F 21/575 |
| 2018/0357045 A1* | 12/2018 | Hollands | G06F 8/10 |

OTHER PUBLICATIONS

Search Report for Application No. GB1902469.4, dated Aug. 9, 2019.

* cited by examiner

SECURITY DATA PROCESSING DEVICE

RELATED APPLICATION(S)

This application claims priority under 35 U.S.C. § 119 or 365 to Great Britain Application No. 1902469.4, filed on Feb. 22, 2019. The entire teachings of the above application(s) are incorporated herein by reference.

TECHNICAL FIELD

The present application relates to a security data processing device used in the secure programming of programmable devices securely.

BACKGROUND

A Hardware Security Module (HSM) is often used to deploy software code and cryptographic keys onto a programmable device securely (for use in a consumer device).

A Hardware Security Module is a device that can create and hold private keys and secret keys securely so that they may not be extracted. The HSM also provides the ability to perform some selected cryptographic operations with the keys.

Generally speaking HSMs are used to hold and use private keys, but have no concept of limiting key operations to a specific requirement of an original customer of the HSM. In fact, FIPS 140-2 (levels 1, 2, 3, 4) requirements tend to prevent the concept of retention of contractual information. The FIPS (Federal Information Processing Standards) approval provides a government certification that the keys and cryptographic algorithms are sufficiently strong for commercial use to ensure they cannot be easily compromised.

SUMMARY

There are typically many parties involved in the production chain of such a programmable device. For example, a silicon chip manufacturer, a factory programming the device, a manufacturing party in the form of an Original Equipment Manufacturer (OEM) who may have commissioned the device, and numerous distributors. The OEM may be referred to herein as a first party, this includes the possibility that a division of an OEM is equated to the first party.

Generally speaking, an OEM is a party that aims to create a product, for example the product may be an IoT device. Part of the production of the IoT device may include the OEM sub-contracting a controller of a factory (e.g. a contract manufacturer) to program digital information onto an agreed number of programmable devices, where the number of programmable devices to be programmed has been agreed between the OEM and the factory controller. Usually the agreement will be in the form of a contract. After the programmable devices have been programmed they may form part of, or all of, the IoT device. The OEM may communicate indirectly with the factory controller e.g. via an intermediary party. In order to program the programmable device, the factory controller may need secret information from the OEM, generally, the secret information will be programmed onto the programmable device. The secret information can include digital certificates, cryptographic keys, and source code used to run the IoT device. In general, the secret information is commercially sensitive information that is required to be programmed onto a programmable device in order to produce the IoT device. Therefore, the OEM needs to ensure that the factory controller has some form of access to the secret information in order to program the agreed number of programmable devices. However, if the OEM were to allow the factory controller unrestricted access to the secret information then the factory controller could program more than the agreed number of programmable devices. The extra devices produced by programming more than the agreed number are known as cloned devices. It is therefore advantageous for the OEM to prevent cloned devices produced by a factory controller, intermediary or any other interloper, ideally there will be no cloned devices produced. This is because cloned devices can be adverse to the OEM for numerous reasons. For example, cloned devices may demand support from the OEM or may use network resources. This can have the effect of lowering the capability of genuine (i.e. non-cloned) devices because servers designated to communicate with the genuine IoT devices may be overburdened due to requests from cloned (i.e. non-genuine) devices. Additionally, faultily produced cloned devices may damage a reputation of the OEM. As a cloned device may be indistinguishable from a genuine device, the OEM may lose resources by repairing, updating or servicing cloned devices. This can therefore lower the efficiency of producing and maintaining products (for example IoT devices). As there may be intermediaries between the OEM and the factory controller, the OEM may effectively be contracting with multiple parties requiring multiple authentications.

The inventors have appreciated that it would be desirable to create a system and/or method that allows a party, such as an OEM, to provide another party with information to be programmed onto a device without the risk of cloned devices being produced.

The HSM is tamperproof, meaning that the HSM is designed such that data stored on the HSM is corrupted if an unauthorized attempt to access the data is attempted. The inventors have recognized that although HSMs can store and use cryptographic information securely, prior art does not teach the concept of HSMs checking received programming requirements prior to programming a device. In fact, the FIPS (Federal Information Processing Standards) generally prevent retention of programming requirements by a HSM, therefore discouraging such action.

According to a first aspect of the present invention, there is provided a security data processing device comprising a processor and a memory coupled to the processor, the processor configured to receive a digital document, said digital document comprising at least one primary programming requirement specified by the first party for programming at least one programmable device; determine if there is a record stored in the memory that corresponds to the digital document; receive a programming request from a programming module of a programming machine in communication with said processor, said programming request requesting the programming of the at least one programmable device; determine if the programming request complies with the at least one primary programming requirement in the digital document; and wherein if said programming request complies with the at least one primary programming requirement in the digital document and if there is no record stored in the memory that corresponds to the digital document, the processor is further configured to: output programming information to the programming module for programming the at least one programmable device; and permanently store a further record in the memory, wherein the further record corresponds to said digital document. The security data processing device may be a Hardware Security Module (HSM) or any other processing device. For example, the security data processing device could be a server with the functionality of an HSM. The digital document may act as a contract because the digital document comprises requirements that must be fulfilled. Therefore, the digital document can be seen as a contract between the first party and third parties.

Advantageously, embodiments of the invention insure for instance that only the requested number of devices are programmed, thus avoiding third parties from being able to manufacture more than has been specified in a contract between a first party (such as an OEM) and a further party (such as an intermediary or factory controller). Further advantageously, embodiments of the invention ensure other clauses of a contract are met, relating to for example a time limit to program a device, or configuring certain options within the programmable device.

In embodiments, the security data processing device is responsible for ensuring the terms of the digital document are adhered to.

Embodiments of the invention provide increased security for programming programmable devices, and reduce the risk of potentially unsecure and faulty clone devices being manufactured. Clone or cloned devices are devices that have been programmed without the OEM (or first party's) permission. Clone devices may be seen as counterfeit devices or unofficial devices but physically they may be very similar or identical to the official devices. Cloned devices may be unsecure as they are often not officially registered with the OEM. Additionally, computation resources of support systems (e.g. cloud services, software updates) provided by the OEM for the manufactured device (which may be an IoT device) may become overloaded to the point of failure if a large number of clone devices are produced and using the support systems. This is because the OEM (or whoever has commissioned the device) will have provided support systems for a known number of devices. Therefore, if a large number of cloned devices are further accessing support systems, then the support systems may fail or slow. Embodiment of the present invention also provide increased efficiency in the manufacturing process of a device by streamlining checks made prior to programming a number of devices.

Advantageously embodiments of the invention provide increased manufacturing security and efficiency for the first party. This is because embodiments of the present invention prevent parties (for example a factory, or an intermediary party) other than the first party from programming (or creating) more devices than the first party has instructed. Additionally, parties other than the first party are prevented from using programming information owned by the first party for any purposes other than programming devices in accordance with the digital document.

The security data processing device may be a Hardware Security Module (HSM). The security data processing device may create and/or hold cryptographic key (including key pairs, public keys and private keys) securely so that the stored/created keys cannot be extracted from the security data processing device. The security data processing device may also have the ability to perform a range of cryptographic functions, including cryptographic functions with keys. In embodiments, the security data processing device retains in memory information related to digital documents that the security data processing device is processing or has processed. The security data processing device may also provide signed reports based on the status of the digital document (i.e. if the programming in line with the digital document has started or the progression of the programming set out in the digital document). These reports can be used by various parties involved with the programmable device to show that the digital document has been honored.

Known HSMs do not store information relating to programming history, relating to received programming requests, or relating to received digital documents. In contrast, in embodiments of the present invention, the security data processing device retains information about each device programmed, or each batch of devices programmed or provisioned, (i.e. information relating to devices programmed by the programming machine and/or the security data processing device) to prevent the same provisioning run being redone more than once.

The digital document may comprise one or more annex, wherein at least one of the one or more annex may be specified by one of at least one further party and may comprise at least one auxiliary programming requirement for programming the at least one programmable device. In other words, the annex may be specified by the same party that specified the primary programming requirements. Additionally, or alternative the annex may be specified by a different party to the party that specified the primary programming requirements. Generally speaking, in embodiments, the term annex is used to indicate some digital information that can be separately validated from the primary programming requirements and forms some clause(s) the digital document.

The one or more annex may comprise one or any combination of: an annex specified by a manufacturer of the at least one programmable device; an annex specified by a provider of equipment used by said manufacturer; an annex specified by the security data processing device; an annex specified by a factory provider of a factory in which the programming machine is located; an annex specified by a security systems provider; an annex specified by a security equipment provider; an annex specified by an operator of security equipment provided by said security equipment provider; an annex specified by a provider of software input onto said programmable device; an annex specified by a certificate provider; and an annex specified by a governmental organization. Additionally, each annex may be digitally signed by the party that specified or wrote the annex.

The processor may be configured to generate a programming report providing an indication of programming undertaken by said programming machine; and output said programming report.

The programming report may be output to one or more of: said programming module; said first party; and a database external to said security data processing device. The programming report may be stored on the security data processing device or an external database(s). Advantageously this means that a record of the programming history can be securely stored so that it may be possible for any party involved in the manufacturing of the programmable device to verify, or refer to, the programming history. The report may be output (wirelessly or by a wired connection) via an interface of the security data processing device.

One or more of said at least one programming requirement may specify where said programming report is output.

At least one programming requirement may specify when a programming report is generated.

One or more of said at least one programming requirement may specify that a programming report is generated: within a specified time period; at a specified time; before a specified number of programmable devices have been programmed by the programming machine; after a programmable device is programmed by said programming machine; each time a defined multiple of said programmable devices have been programmed; at a time when a specified number of programmable devices have been programmed by the programming machine; if an indication to generate a programming report is received by said processor, preferably wherein said indication is received in response to a suspension of said programmable device; in response to said processor receiving a report request from said first party or said second party, wherein said report request requests a programming report.

The programming report may be digitally signed by the security data processing device. Advantageously this means that it is very difficult, or impossible, for any party to tamper with the programming report. Similarly, it also means that it is very difficult, or impossible, for any party to repudiate because there is a valid report that may give details of what has been programmed.

If at least one of said auxiliary and primary programming requirements fails to comply with the said programming request, the processor may be configured to output an indication that the digital document has been rejected. Advantageously this may alert a party that the programming machine has attempted to program devices in a way that is contrary to an agreement. A party involved may want to take action if such an event occurs. An alert or indication is an effective way of doing this.

The indication that the digital document has been rejected may be output to one or more of: said first party; and a party that specified said programming requirement that fails to comply with the programming request.

If there is a record stored in the memory that corresponds to the digital document, the processor may be configured to transmit an indication that the digital document has been rejected to the first party.

The processor may be configured to generate said programming report comprising one or more of: an indication of a number of programmable devices programmed by the programming machine since either: a previously generated programming report was generated; or a start time specified by a programming requirement; a programming report time indicating a time that said programming report is generated; and a reference to, or indication of, said digital document.

The processor may be configured to output said report.

The processor may be configured to: analyze each of the one or more annex independently; and determine if each of the one of more annex is in compliance with said programming request.

The digital document may be digitally signed by the first party. The digital signature advantageously provides verification that the digital document has been approved by the first party. Additionally, it means that the digital document is difficult or impossible to tamper with. This advantageously means that it is very difficult for a party to modify a valid digital document in order to produce (and/or program) clone devices. It further advantageously means that it is difficult for a party to change the digital document so that it meets a programming request which would not have been met by the unedited digital document. If further provides advantages to the party in control of the programming machine because a signed digital document provides evidence that the digital document that is to be programmed has been validly written and approved by the first party. Thereby the party in control of the programming machine can hold the first party accountable to, for example, payments due for the programmed devices. Advantageously, by using embodiments of the present invention, it would mean that the first party would find it difficult to claim that they did not instruct the party in control of the programming machine to undertake the task of programming the devices.

One or more of the at least one programming requirement may comprise at least one of: a threshold number of times a cryptographic key stored in the memory can be used in a cryptographic operation; a time period during which said programming machine is authorized to program said at least one programmable device; a feature of said at least one programmable device which must be configured to be disabled; and a number of programmable devices that the programming module is authorized to program.

The programming information may comprise at least one of: cryptographic information stored in said memory; cryptographic information generated by said processor, optionally wherein said cryptographic information is generated in response to said processor receiving said programming request; cryptographic information retrieved from said digital document by said processor, preferably information retrieved from one or more of the at least one annex; and an instruction for said programming machine to obtain cryptographic information from a data store in communication with said programming machine. The programming information may be programmed onto the programmable device. Advantageously the programming information is stored on the security data processing device which prevents a party other than the first party get access to the programming information. The programming information may be Intellectual Property Rights (IPR) held by the first party. The IPR is of high value and so should be protected but also some of the IPR usually needs to be programmed onto devices (for example, software, keys etc.).

The processor may be configured to generate said cryptographic information in response to receiving said programming request.

The processor may be configured to retrieve cryptographic information from said digital document.

The cryptographic information may comprise at least one of: a password; a cryptographic key; a digital certificate; and cryptographic information that enables the programmable device to be authenticated.

The programming information may comprise non-cryptographic information.

The non-cryptographic information may comprise at least one of: application images and a driver image database.

The processor may be configured to use a priority mechanism to resolve a conflict between multiple requirements.

The digital document is received from at least one of: said first party; and said programming machine.

The primary and/or auxiliary programming requirement(s) may be a reference to a programming requirement; and/or an instruction to obtain a programming requirement.

The first party may be an original equipment manufacturer (OEM), optionally being a division of an OEM.

The further record may comprise an indication that a programmable device has been programmed in accordance with: said digital document; and/or said programming request.

The further record comprises at least one of: one or more characteristics of said digital document; and a reference to a programmable device that has been programmed by said programming machine.

At least one of said auxiliary and primary programming requirements may comprise an indication of one or more security data processing devices that are allowed to output said programming information.

According to another aspect of the present invention, there is provided a method comprising: receiving a digital document, said digital document comprising at least one primary programming requirement specified by the first party for programming at least one programmable device; determining if there is a record stored in the memory that corresponds to the digital document; receiving a programming request from a programming module of a programming machine in communication with said processor, said programming request requesting the programming of the at least one programmable device; determining if the programming request complies with the at least one primary programming requirement in the digital document; and wherein if said programming request complies with the at least one primary programming requirement in the digital document and if there is no record stored in the memory that corresponds to the digital document, the method further comprises: outputting programming information to the programming module for programming the at least one programmable device; and permanently storing a further record in the memory, wherein the further record corresponds to said digital document.

According to another aspect of the present invention, there is provided a non-transitory computer-readable medium, the non-transitory computer-readable medium storing instructions that, when executed by a processor, cause the processor to: receive a digital document, said digital document comprising at least one primary programming requirement specified by the first party for programming at least one programmable device; determine if there is a record stored in the memory that corresponds to the digital document; receive a programming request from a programming module of a programming machine in communication with said processor, said programming request requesting the programming of the at least one programmable device; and determine if the programming request complies with the at least one primary programming requirement in the digital document; wherein if said programming request complies with the at least one primary programming requirement in the digital document and if there is no record stored in the memory that corresponds to the digital document, the processor is further configured to: output programming information to the programming module for programming the at least one programmable device; and permanently store a further record in the memory, wherein the further record corresponds to said digital document.

The instructions may be provided on a carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Figure 1:
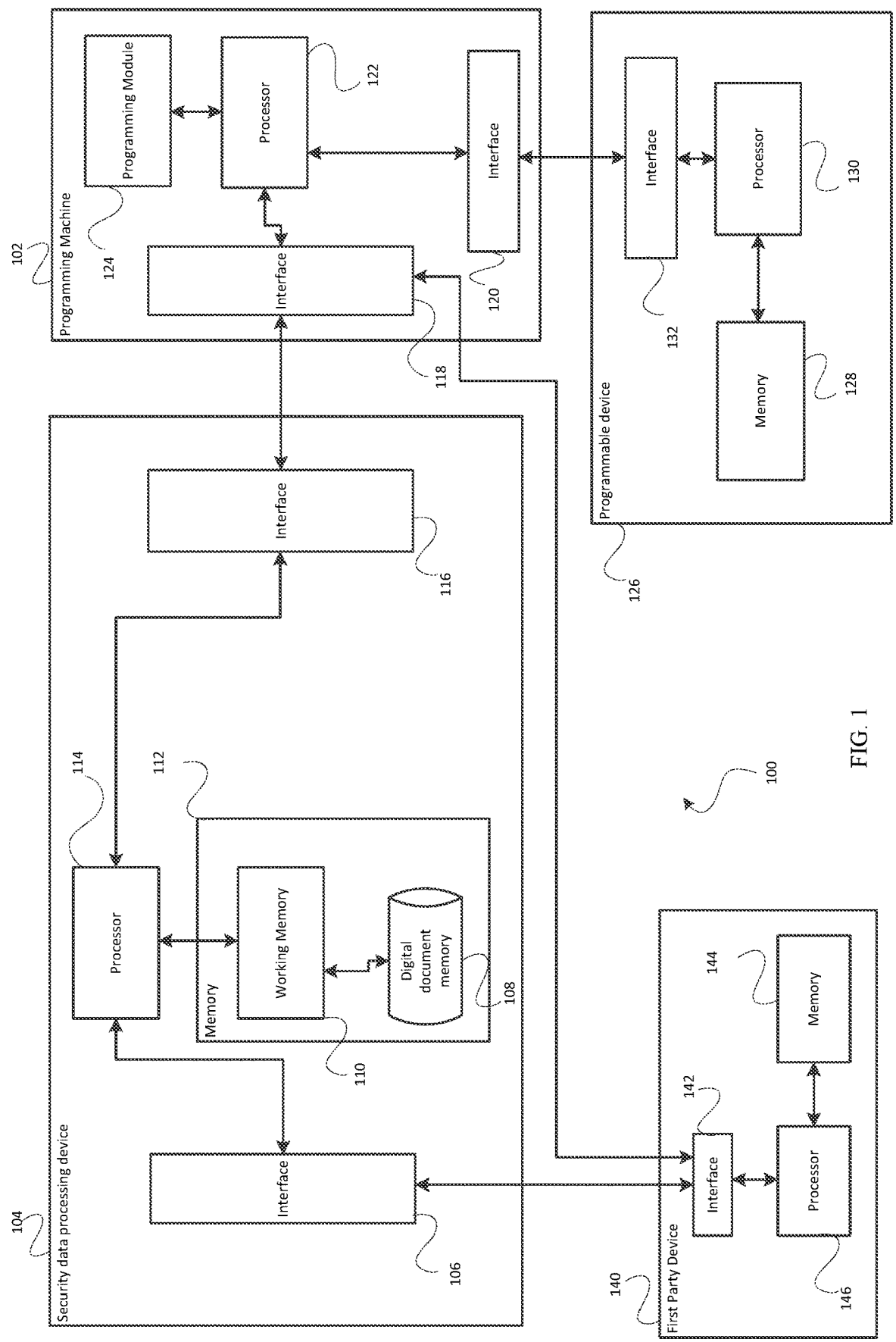
FIG. 1 shows a block diagram of a programming system 100.

FIG. 1 shows a block diagram of a programming system 100.

Programming system 100 comprises a security data processing device 104, a programming machine 102, a programmable device 126 and optionally a first party device 140.

The security data processing device 104 may have physical restrictions that prevent unauthorized parties from tampering with the security data processing device 104 or from obtaining information from it. The security data processing device 104 comprises a processor 114, interface 116, memory 112 comprising working memory 110 and digital document memory 108. The security data processing device 104 optionally comprises an interface 106 to communicate with an interface 142 of the first party device 140. The communication may be wired or wireless.

The processor 114 is coupled to interface 116, interface 106, working memory and digital document memory. The processor 114 is configured to run code stored in the working memory 110. The processor 114 is further configured to retrieve documents stored in the digital document memory 108, and is further configured to store documents in the digital document memory 108. Working memory 110 comprises code which when run, causes processor to perform steps described herein. The digital document memory 108 may be a subsection of working memory 110, the digital document memory 108 may be a separate database accessible to processor 114, and may form part of the security data processing device 104 or may be remote to the security data processing device 104. The digital document memory 108 is configured to store digital documents. The interface 116 is configured to communicate with an interface 118 of the programming machine 102. Interfaces 116 and 118 may communicate wirelessly or via a wired connection. Generally speaking security data processing device 104 can comprise processing ability, including hardware-based crypto-acceleration.

Programming machine 102 comprises the interface 118, a processor 122, a programming module 124 and an interface 120. Programming machine 102 is configured to program a programmable device. In other words, the programming machine inputs, or 'programs', software and other digital information onto a memory 128 of a programmable device 126. The programming machine is able to program many devices such as 126. The processor 122 is coupled to the interface 118, the programming module 124 and the interface 120. The processor 122 runs code stores on the programming module 124 in order to program the programmable device via interface 120 and interface 132. As part of the method of programming the programmable device 126, the processor 122 (of the programming machine) may retrieve information stored in the digital document memory 108 and/or the working memory 110 of the security data processing device 104. The information (and/or information derived from the retrieved information, for example an encrypted copy of the retrieved information) retrieved from the security data processing device is then programmed onto the memory 128 of the programmable device 126 via interfaces 120 and 132. The processor 122 may be configured to receive instructions, from the security data processing device 104, to obtain information.

The programmable device 126 comprises interface 132, memory 128 and processor 130. The programmable device 126 communicates with the programming machine 102 via interface 132 communicating with interface 120. The programmable device may be for example a silicon chip, microprocessor or microcontroller. The processor 130 is coupled to the interface 132 and the memory 128.

The first party device 140 may be a device such as a general purpose computing device under the control of an OEM, or a commissioner of the programmable device and/or a product which comprises programmable device 126. The first party device comprises an interface 142, processor 146 and memory 144. Interface 142 may be configured to communicate with interface 106 of the security data processing device 102, and further with the interface 118 of the programming machine 102 and further with a user (of the first party). In other words, the first party device 140 may be configured to transmit a digital document to the security data processing device 104 either directly via interfaces 142 and 106, or indirectly, via the programming machine 102 (i.e. via interfaces 142 and 118 and then 118 and 116).

The communication between interface 106 and 142, 116 and 118, 120 and 132, 142 and 118 may be wired or wireless.

Figure 2:
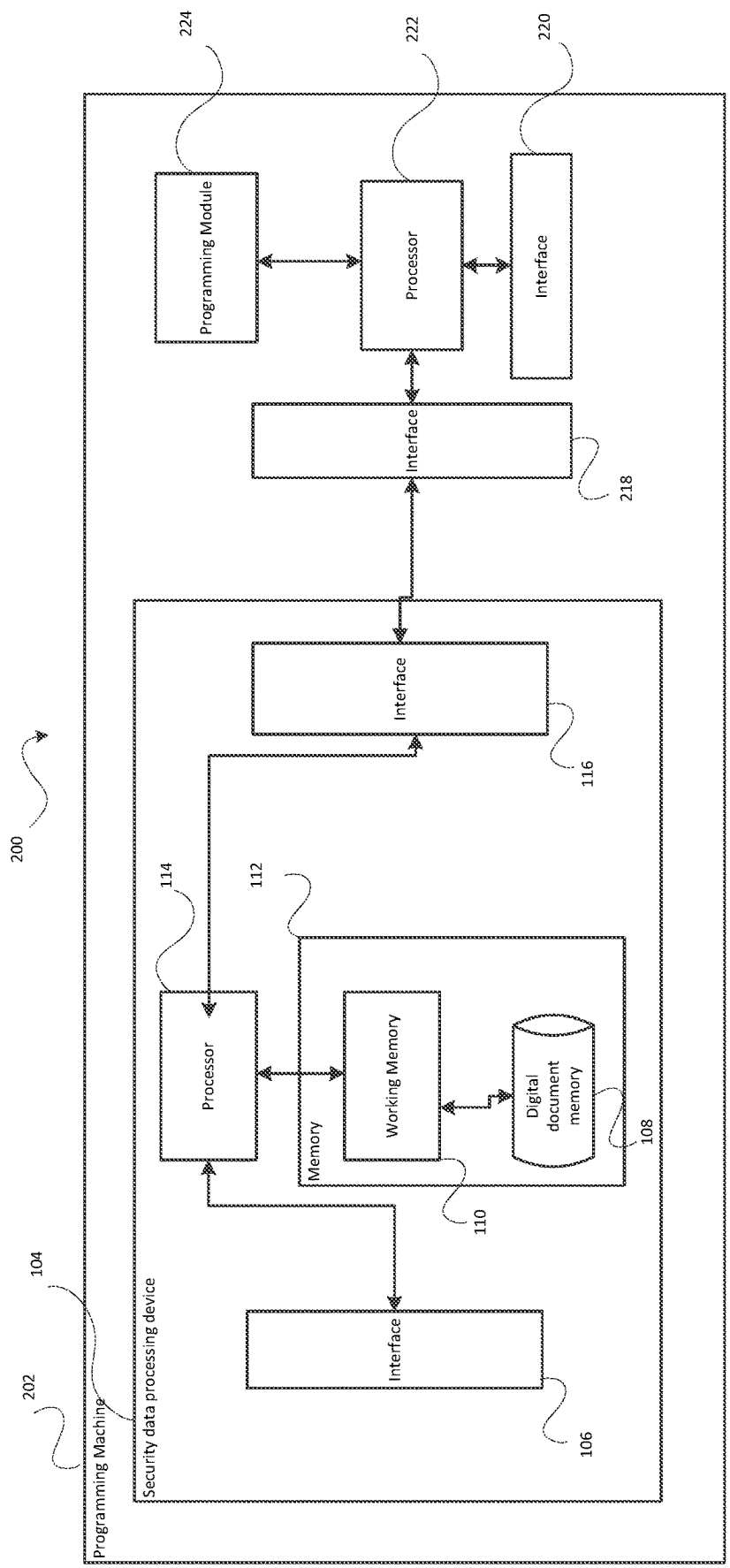
FIG. 2 shows a block diagram of a programming system 200.

FIG. 2 shows a block diagram of a programming system 200.

Programming system 200 comprises a security data processing device 104.

In FIG. 2 it can be seen that the security data processing device 104 is part of and/or encased in the programming machine 202. Security data processing device 104 may be coupled to the programming machine 202.

Programming machine 202 comprises the interface 218, a processor 222, a programming module 224 and an interface 220. Programming machine 202 is configured to program a programmable device.

Figure 3:
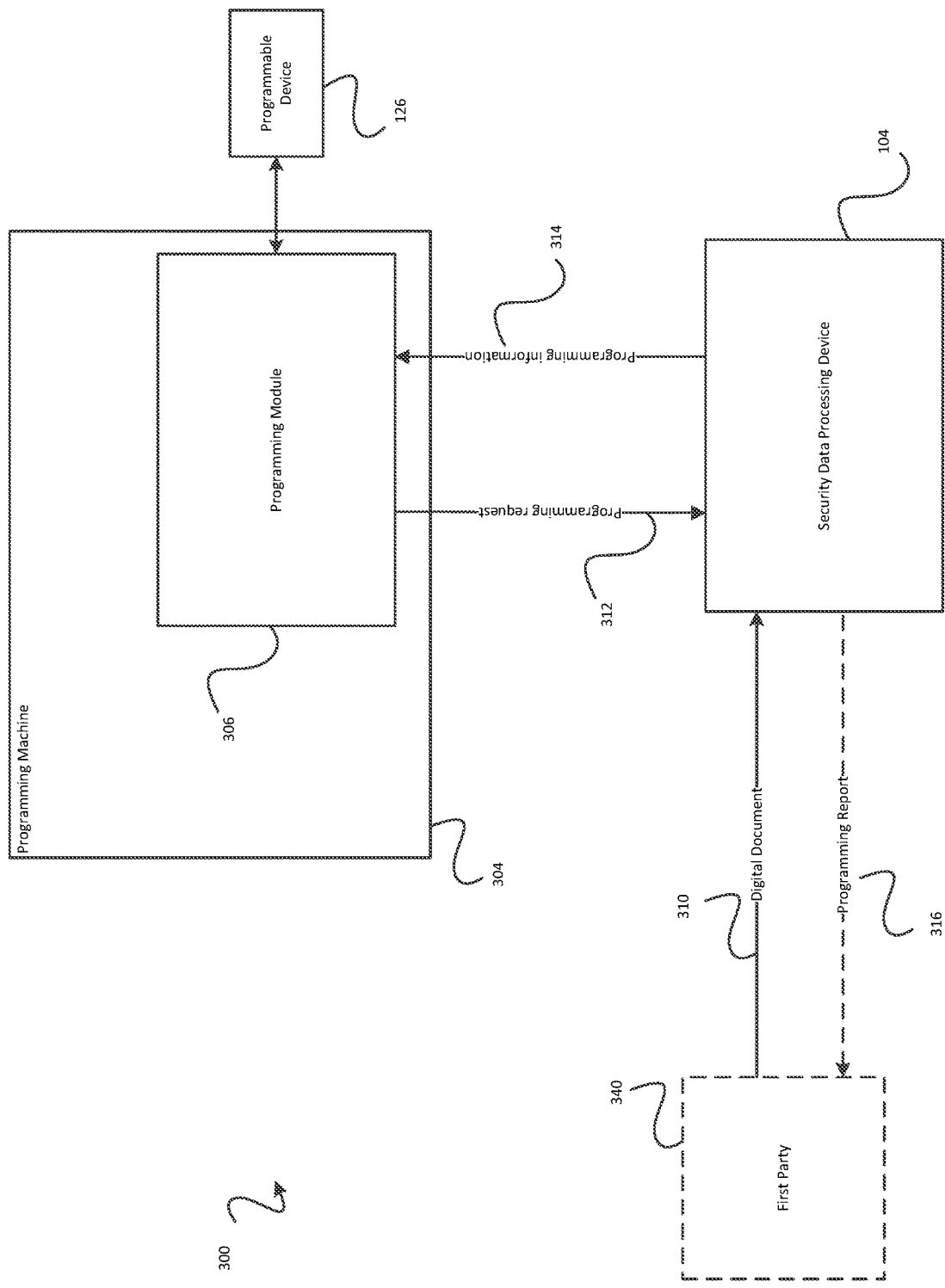
FIG. 3 shows a block diagram of the flow of information in and out of security data processing device.

FIG. 3 shows a block diagram 300 illustrating the flow of information in and out of security data processing device 104. The block diagram comprises the first party 340 (the first party 340 may comprise first party device 140), programmable device 126, the security data processing device 104, programming module 306 and programming machine 304. Programming module 306 may be the programming module 124 and/or 224. Programming machine 304 may be programming machine 102 and/or 202.

A digital document 310 is received by security data processing device 104. The digital document is discussed later with respect to FIG. 5. The digital document may be received directly from a first party, in some cases the first party may be the Original Equipment Manufacturer 602 of FIG. 6. In other embodiments the digital document 310 is received indirectly from the first party.

The security data processing device 104 receives a programming request (312) from the programming module 306. The programming request is a request to program one or more programmable devices. The programming request requests programming information from the security data processing device 104, for example cryptographic keys and/or software that will be programmed onto the programmable device 126 by the programming machine. The programming information may allow the programmable device to be securely authenticated across the Internet so that only genuine products (i.e. devices authorized to be programmed by the first party) will be permitted connection (for service, management, and other activities). The security data processing device 104 checks to see that the programming request is in compliance with the digital document. If this is the case then the security data processing device 104 sends programming information (314) to the programming module 306. The programming information contains at least the information requested in the programming request.

Optionally the security data processing device 104 outputs a programming report (316). The programming report may be sent to the first party 140. The programming report may be sent directly or indirectly to the first party or another party.

Figure 4:
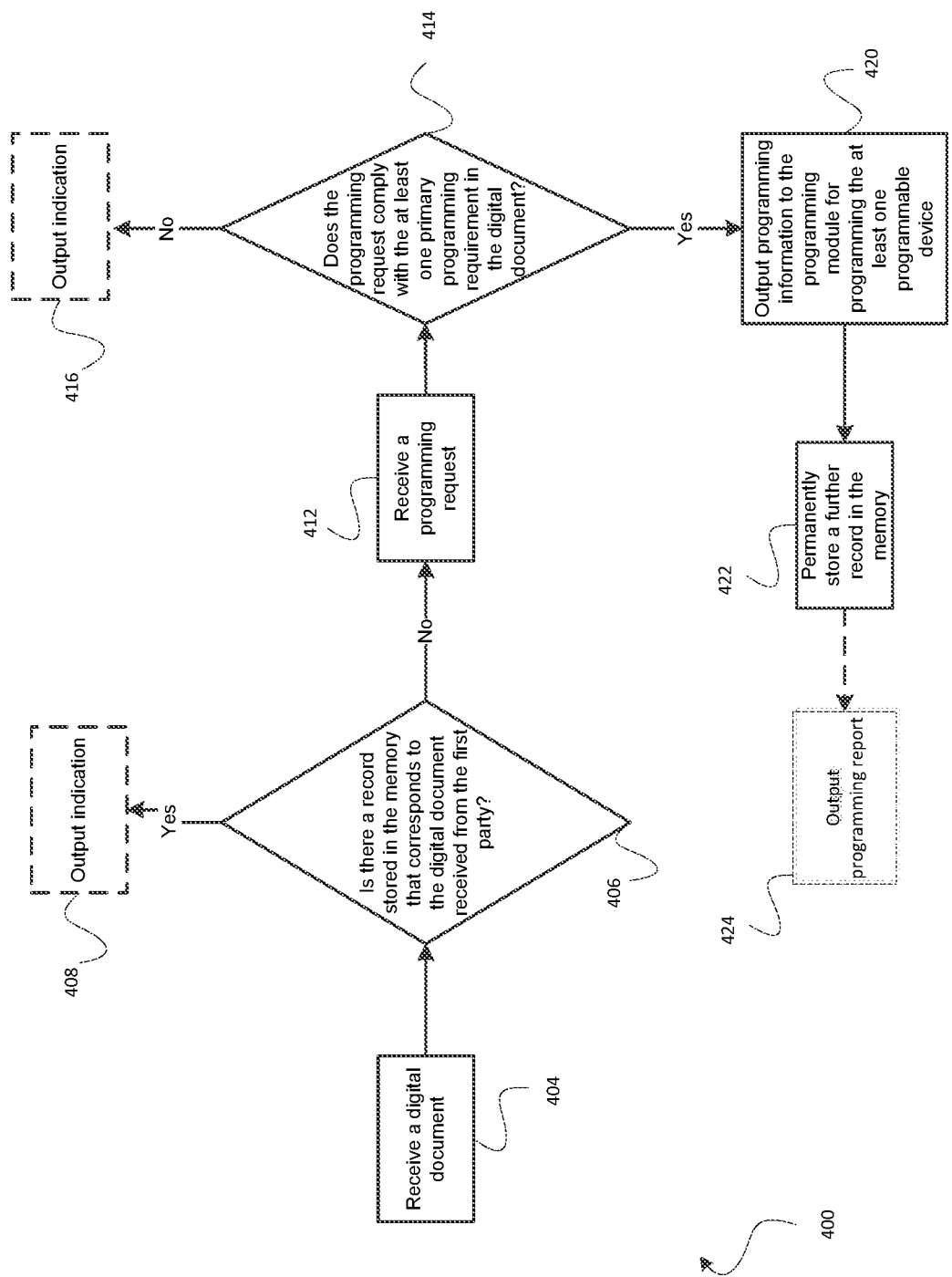
FIG. 4 shows a method of verifying the validity of a request to program a device.

FIG. 4 shows a method (400) of verifying a programming request.

The method 400 is performed by the processor 114 of the security data processing device 104.

At step 404, the processor 114 receives a digital document. The digital document comprises at least one primary programming requirement. The at least one primary programming requirements are requirements that must be fulfilled and are specified by a first party. The first party may be the OEM 602 of FIG. 6. The digital document may be received by the processor 114 directly from the first party via interface 106, or via an intermediary party 604 via interface 106. The digital document may also be received from the first party through the programming machine via interface 116. However, the digital document is received, in this example the document originates from the first party. The digital document is received electronically.

The digital document may comprise a requirement that specifies one or more identities of security data processing device(s) that can process the digital document and/or a programming request in accordance with the digital document.

After the digital document has been received by processor 114, the processor 114 is configured to determine if there is a record stored in memory 112 that corresponds to the received digital document. For example, the record may be a previously received digital document. The record may be the digital document stored in its entirety or may be only parts of the previously received digital document. For example, the record could be a hash of a previous digital document. The record could be a condensed version of the digital document. The record could for example be a series of options that when combined with a digital document template can create a digital document. The record may only be representative of a part of the information of the previously received digital document.

The primary aim of step 406 is to determine if an attempt is being made to fulfil the same digital document more than once. Advantageously this means that the security data processing device can ultimately deny the programming machine 102 (and/or 202) in this scenario from programming clone devices. If the processor 114 determines that there is already a record stored in memory that corresponds to the received digital document then the processor 114 may optionally output an indication (step 408). However, irrespective of whether an indication is output, if the processor 114 determines that there is already a record stored in memory that corresponds to the received digital document then the processor 114 will not output programming information to the programming machine 102 (and/or 202). In other words, the security data processing device will stop the digital document from being fulfilled. The indication may be an alarm or a message sent to another party, for example sent to the OEM 602 or the intermediary 604 of FIG. 6. The indication may be sent to the first party. The indication may be a log that an attempt was made to fulfil a digital document more than once, such an indication may similarly be sent to the first party, and/or may be sent to the memory of the security data processing device to be stored. The log is stored in the memory of the security data processing device so that an authorized party can access the log at a later date and determine how many indications have been made, this would indicate how many unauthorized digital documents had been received by the security data processing device. The process may end after step 408. The process may end directly after step 406. The process may begin again when a further new digital document is received by the processor 114.

At step 412, the processor 114 of the security data processing device receives a programming request. The programming request is received from the programming machine 102 (and/or 202) via interfaces 118 and 116. The programming request comprises a request for the programming machine 102 (and/or 202) to program a number of programmable devices 126. There may be further information contained in the programming request, for example, the specifications of the type of the device to be programmed (for example, memory of the programmable device to be activated, CPU, chip make, time allocated for programming each device, etc.). The programming request may request that some information is output to the programming machine. This information will be used to program the programmable device(s) 126 and in some cases the information output by the security data processing device in response to the programming request will be programmed directly onto the programmable device 126 by the programming machine 102 (and/or 202).

At step 414, the processor is configured to determine if the programming request complies with the requirements set out in the digital document received in step 404). During step 414 the processor determines if the primary programming requirements (requirements stipulated by the first party) are met and further if the auxiliary requirements are met (the auxiliary requirement may have been stipulated by any party including the first party).

An example of where a programming requirement is not met is as follows. A programming requirement may state that only 500 programmable devices can be programmed. The programming request may request that 1000 devices are programmed. In this scenario, the programming request does not comply with the programming requirement of the digital document and therefore the programming information will not be output to the programming module.

A further example of where a programming requirement is not met is as follows. A programming requirement may state that programmable devices can only be programmed between 1 Jan. 2018 and 1 Jun. 2018. The programming request may request that a number of devices are programmed during October 2018. In this scenario, the programming request does not comply with the programming requirement of the digital document and therefore the programming information will not be output to the programming module.

An example of where the programming requirement is met is as follows. A programming requirement may state that only 500 programmable devices can be programmed. The programming request may request that 500 devices are programmed. In this scenario, the programming request complies with the programming requirement of the digital document and therefore, if all of the other programming requirements are met, then the programming information will be output to the programming module.

A further example of where a programming requirement is met is as follows. A programming requirement may state that programmable devices can only be programmed between 1 Jan. 2018 and 1 Jun. 2018. The programming request may request that a number of devices are programmed during March 2018. In this scenario, the programming request complies with the programming requirement of the digital document and therefore, if all of the other programming requirements are met, the programming information will be output to the programming module.

The security data processing device 104 will only output the information as requested in the programming request if the processor of 114 the security data processing device determines that all requirements that must be met are met. The digital document states requirements that must be met. In some example, the digital document may set out two or more alternative that are both acceptable, in this case, the programming requirement fulfils this requirement if any of the alternatives are met by the programming request.

Optionally, if the processor 114 determines that the programming request does not comply with all of the programming requirements of the received digital document then an indication may be output by the processor (step 416). The processor 114 may output this indication to the first party. Alternatively, the processor may output the indication to memory 112 for storage. The processor 114 may output the indication to a third party, where the third party is the party connected to the programming requirement that was not fulfilled. For example, if the programming request comprised a request for 1000 devices to be programmed but the programming requirement (set out in the digital document) stated only 500 devices could be programmed then the processor 114 is configured to determine that part of the programming request does not comply with at least one programming requirement. The processor 114 may then output an indication to the first party that the programming machine attempted to program more devices than was agreed in the digital document. In an example, an auxiliary programming requirement may have been defined by the Programmable Device Manufacturer 610 of FIG. 6 that only a basic level of functionality of the programmable device can be accessed. If the programming request requests that programmable devices be programmed to a high level of functionality then the programming request does not fulfil the digital document. In this scenario, although the processor 114 may output an indication to the first party, the processor 114 may alternatively or additionally output an indication to the programmable device manufacturer 610 because it was the programmable device manufacturer's 610 requirement that was not fulfilled. In any case, if the programming requirements are not fulfilled by the programming request then the security data processing device does not provide the requested information (that is necessary to program a device) to the programming machine 102 (and/or 202). The process ends (optionally following step 416) if the processor 114 determines that the programming request does not comply with all of the programming requirements of the received digital document.

The steps of 412 and 406 may be in the reverse order as shown. When step 412 is performed before step 406, step 414 may or may not be performed before 406.

Step 412 may be performed before step 404. Generally speaking, any order may be possible, however, step 406 can generally only be performed once step 404 has been performed. Similarly, step 414 can generally only be performed after step 412 has been performed.

If the processor 114 determines that the programming request does comply with the programming requirements (and the processor 114 has further determined that there is no record stored in the memory that corresponds to the digital document, which is optionally received from the first party), then the processor outputs programming information to the programming module 124 (and/or 224) of the programming machine (step 420). The outputted programming information is generally the information requested for in the programming request. The outputted programming information can be communicated to the programming module 124 (and/or 224) via interfaces 116 and 118 (and/or 218) and further optionally via processor 122. The programming machine then uses the programming information to program one or more programmable devices 126.

At step 422 the processor 114 is configured to store a record of the received digital document in memory 112 (preferably in digital document memory 108). Step 422 may only happen once the processor 114 has received an indication that the programming request has been fulfilled or completed. The processor 114 may be configured to receive an indication that the programming request has been fulfilled or completed. The processor 114 may additionally or alternative receive an indication that the terms of the digital document have been fulfilled. These indications may be received from the programming machine 102 (and/or 202) via interfaces 118 and 116 (and/or 218). These indications may be received from the first party. The record of the digital document is stored in the memory of the security data processing device so that when/if a further digital document is received in the future, the processor 114 is able to check if the digital document has been fulfilled by comparing to previously fulfilled digital documents (by utilizing the stored records which correspond to previously fulfilled digital documents). This has the advantage over security data processing devices of the prior art because embodiments of the present invention provide a security data processing device that can determine if a digital document has been fulfilled before. Advantageously the record is stored in the tamper proof security data processing device. This is advantageous over storing the record elsewhere because when stored on a security data processing device, the record is very difficult to tamper with.

Optionally, the processor may be configured to output a programming report 424. This may be done before or after step 422. Generally, the processor may be configured to output a programming report at any time, for example upon receiving a request to output a programming report. The programming report may be information relating to the status of present programming by the programming machine. The programming report may be information relating to the programmable devices programmed by the programming machine.

Figure 5:
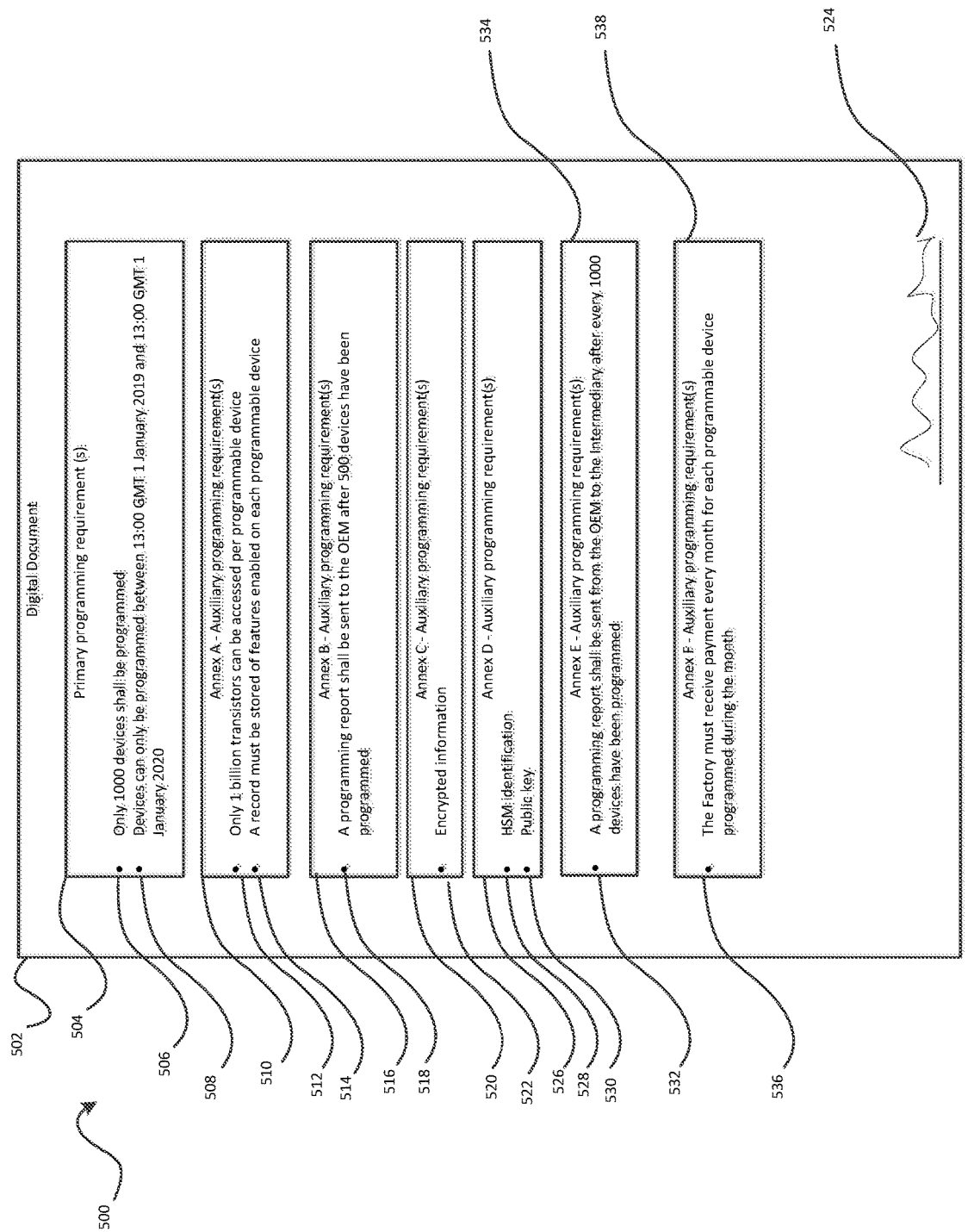
FIG. 5 shows a pictorial representation of a digital document.

FIG. 5 shows a graphical representation of a digital document (500). In this embodiment, the digital document 502 comprises a main body 504, and four annexes (510, 516, 520, 522).

The main body 504 comprises one or more primary programming requirements. For example, 506 "Only 1000 devices shall be programmed" and 508 "Devices can only be programmed between 13:00 GMT 1 Jan. 2019 and 13:00 GMT 1 Jan. 2020".

Annex A 510 comprises two auxiliary requirements, 512 "Only 1 billion transistors can be accessed per programmable device" and 514 "A record must be stored of features enabled on each programmable device".

Annex B 516 comprises one auxiliary requirement, 518, "A programming report shall be sent to the OEM after 500 devices have been programmed".

Annex C 520 comprises one auxiliary requirement 522 "Encrypted information".

Annex D 526 comprises two auxiliary requirements 528 "HSM identification" and 530 "public key".

Annex E 534 comprises one auxiliary requirement 532 "A programming report shall be sent from the OEM to the Intermediary after every 1000 devices have been programmed".

Annex F 538 comprises one auxiliary requirement 536 "The Factory must receive payment every month for each programmable device programmed during the month".

Digital document 502 may correspond to digital document 310 in FIG. 3. The main body 504 comprises primary programming requirements specified by a first party, which may be an OEM, a division of an OEM, or another party. Primary programming requirements 506 and 508 show examples of requirements that have been written by the first party in the digital document 502. In other words, the first party may also be composed of separate departments (for example first party Security Admin, first party procurement), one of which may add some clauses (annexes) to which it wants other departments to adhere. This may be included as part of the digital document. These clauses (annexes) might be, for instance, the definition of root certificates for use by all departments Annex 510 specifies two auxiliary programming requirements (512 and 514). Annex 510 is a group of two programming requirements specified by a manufacturer of the at least one programmable device. Annex 516 specifies one requirement (518). Annex 516 is specified by the first party. Annex 520 merely contains encrypted information (522) specified by the first party. For example, this may be an encrypted key or encrypted software that will be retrieved by the programming machine (if the programming machine is authorized to program the programmable device) and then input onto the programmable device. As a further example an annex 520 may comprise encrypted software may be used by the security data processing device to sign device certificates. Annex 520 is specified by the first party. 524 is a signature. It should be understood that this is a pictorial representation. In embodiments, the signature may be a digital signature including a key based digital signature. The digital signature may further involve a hash function. The signature may utilize any of: an RSA algorithm, an EC-DSA algorithm, and a GMR signature scheme. Additionally, each annex (i.e. each set of auxiliary programming requirements 510, 516, 520, 526) is digitally signed by the party who has written the annex. Annex 526 contains a security data processing device identification 526 and a public key 528. The security data processing device identification identifies a security data processing device (or a group of security data processing devices) that are required to be used to program the programming device (in conjunction with a programming machine). Annex 526 further comprises a public key used for signatures and other cryptographic functions.

Figure 6:
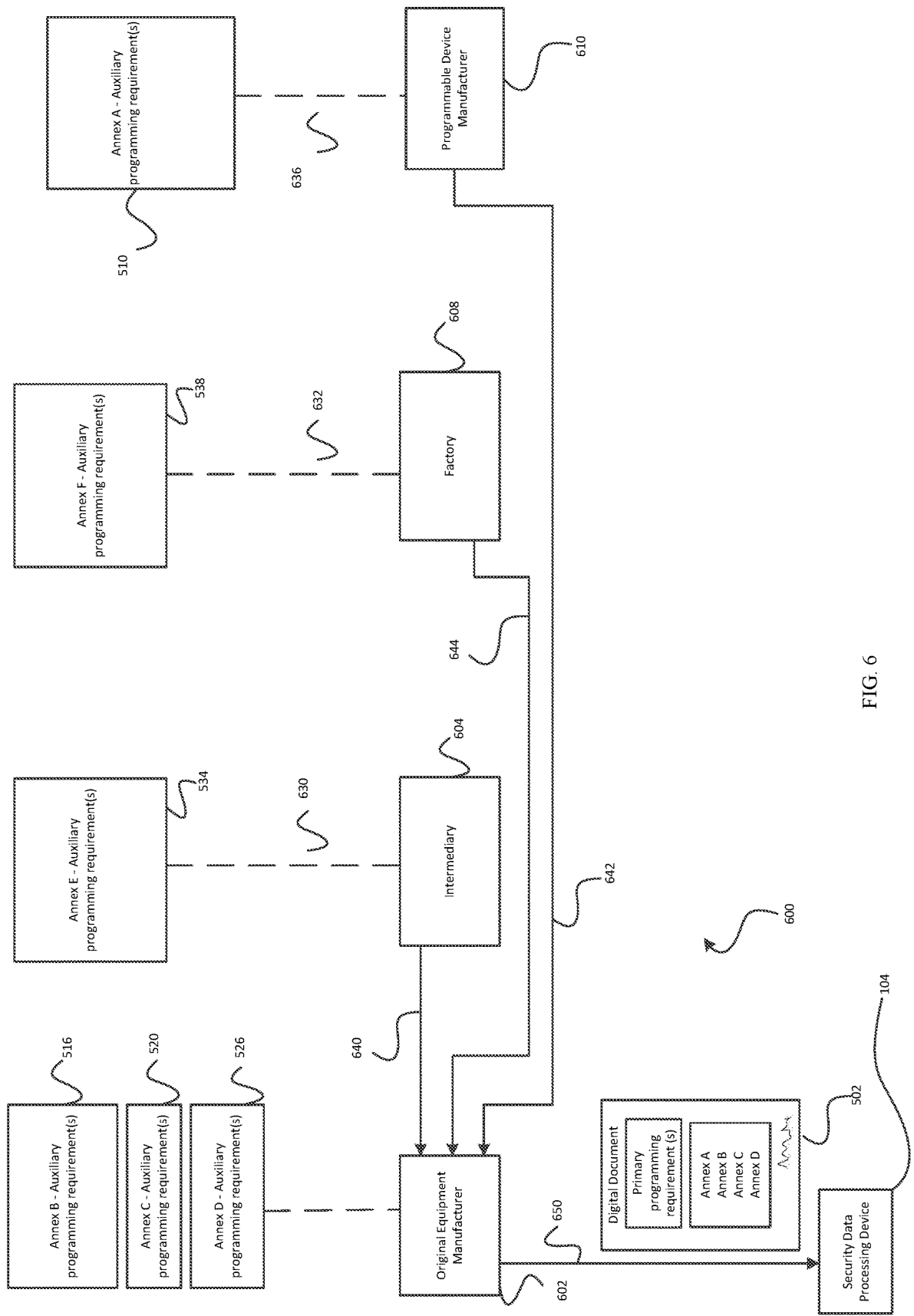
FIG. 6 shows a block diagram of a system 600.

FIG. 6 is an example of is a system 600 comprising an Original Equipment Manufacturer (OEM) 602, an Intermediary 604, a factory 608, and a Programmable Device Manufacturer 610. The Original Equipment Manufacturer (OEM) 602 may be the first party as previously referred to.

The factory 608 may be the party that programs programmable devices, where the programmable devices have been manufactured by programmable device manufacturer 610.

The Programmable Device Manufacturer 610 may manufacturer silicon chips that are used in many different devices. Programmable Device Manufacturer 610 may produce a generic silicon chip (or generally a microprocessor) that is capable of performing at different processing levels, depending on which parts (or features) of the chip have been enabled. Programmable Device Manufacturer 610 may have sold programmable devices with only certain features enabled (for example a certain level of memory or CPU) and does not therefore want the factory 608 to program the Programmable Device in such a way as to enable higher specification features than has been agreed (and/or paid for).

Factory 608 may input software and cryptographic information (received in the programming information) onto programmable devices for an OEM 602. Factory 608 may want to prove to OEM 602 that only a certain number of devices were programmed. In some instances, factory 608 may want proof that the programmable devices were programmed in line with an agreement with Programmable Device Manufacturer 610 because the factory 608 may receive remuneration for programming the programmable devices in line with the agreement. The Factory is responsible for utilizing the security data processing device 104 to program the required number (as set out in the digital document) of programmable devices. The programmable devices will then be put in the OEM's products (by the Factory 608 or some other manufacturing facility).

FIG. 6 shows an example of some of the parties involved in what may be referred to as production chain of a product comprising a programmable device. The product may be an IoT device such as a smart watch, a smart sensor, a smartphone, or a smart speaker. The product produced by the system of FIG. 6 is generally commissioned by the OEM 602. An OEM 602 usually works with many parties to bring a product (such as the IoT device) to market. As there may be many parties to communicate with, the OEM 602 may work with an intermediary 604 to orchestrate and collate information from the many parties. In other words, the intermediary 604 may oversee a proportion of the production of the product on behalf of the OEM 602. The OEM 602 may not trust other parties in the production chain with the OEM's Intellectual Property Rights, such as source code and keys. However, for example, the factory 608 generally needs access to some form of the OEM's IPR (even if it is encrypted) in order to program a programmable device with the OEM's IPR. In this example the IPR may be the operating software, a digital certificate, or a cryptographic key but numerous other examples exist. Generally speaking, each party in the production chain will have requirements that they want to be met by at least one other party involved in the production process. However, it may be difficult for each of the parties to oversee, confirm and/or enforce that their requirements are met by the at least one other party. Additionally, it is also difficult for parties to prove or disprove to the other parties that their requirements (either requirements they stipulated or requirements that were required of them) have (or have not) been met. Embodiments of the invention provide a system to ensure requirements are met and to provide proof to others that the requirements have been met.

An OEM 602 may prepare a digital document regarding the production of the programmable device. The OEM 602 writes the primary programming requirements, otherwise referred to as the main body of the digital document. An example of a contract is the digital document 502 in in FIG. 5. Examples of parameters set in the digital document may be the technical specifications of the programmable devices to be programmed, what information is programmed onto the device, the number of units of programmable devices to be programmed by the Device programmer, etc. The primary programming requirements, also referred to as the main body of the digital document, can be seen in item 504 in FIG. 5.

There may further be requirements set out by other parties (i.e. an intermediary 604, factory 608, and Programmable Device Manufacturer 610) that the other parties wish to be appended to the digital document. These may be seen as annexes or appendages to the digital document. The annexes or appendages comprise auxiliary requirements which are requirements set out by a party that have not written the main body of the digital document. Divisions of the OEM 602 may also have their own requirements and thus may add their own annexes to the digital document. It is also possible that the first party (e.g. OEM 602) may write an annex, e.g. 520, 526 of FIG. 5).

In FIG. 6, the dashed lines 630, 632 and 636 represent the link between intermediary 604, factory 608, programmable device manufacturer 610 and Annex E, F and A respectively. Once each of the parties 604, 608 and 610 have created their annex(s), each of the parties sends the annex to OEM 602. The sending of the annexes to the OEM 602 can be seen in arrows 640, 642 and 644. The OEM 602 collates the main body and the annexes and signs the completed digital document. Preferably the first party (e.g. OEM 602) digitally signs the digital document. In embodiments parties creating annexes may send the annex(es) to intermediary 604, in this example, the intermediary will collate the annexes and prepare the digital document so that it is ready to be signed by the OEM 602 (first party). In embodiments the annex(es) may be sent to the OEM 602 and then passed on to the intermediary 604 to collate. In general, annex(es) may be sent electronically or physically.

Once the OEM 602 (or more broadly speaking, the first party) has signed the digital document 502, the digital document is sent (650) to the security data processing device 104. This step also corresponds to step 310 in FIG. 3.

The components of the factory 608 may be considered an entity spread across multiple locations or may be contained in one machine or one location (i.e. a factory). The security data processing device 104 may be a group of security data processing device, either in the same location or spread across multiple locations.

In some embodiments, the OEM 302 may only provide the intermediary 304 with cryptographically protected information (for example a key, or a certificate), encrypted IPR (for example software) and a number of devices to be programed. The intermediary may then prepare the remainder of the digital document, for example, the timings of when programmable devices are to be programmed, the exact specifications of the programmable devices required from the programmable device manufacturer 318 (e.g. memory specifications, CPU specifications), etc.

In embodiments, the programming report of 316 in FIG. 3 is passed by the factory 608 and/or intermediary 604 back to the OEM 602 for verification that the digital document has been completed, or at an intermediary stage to verify status of devices provisioned so far.

Figure 7:
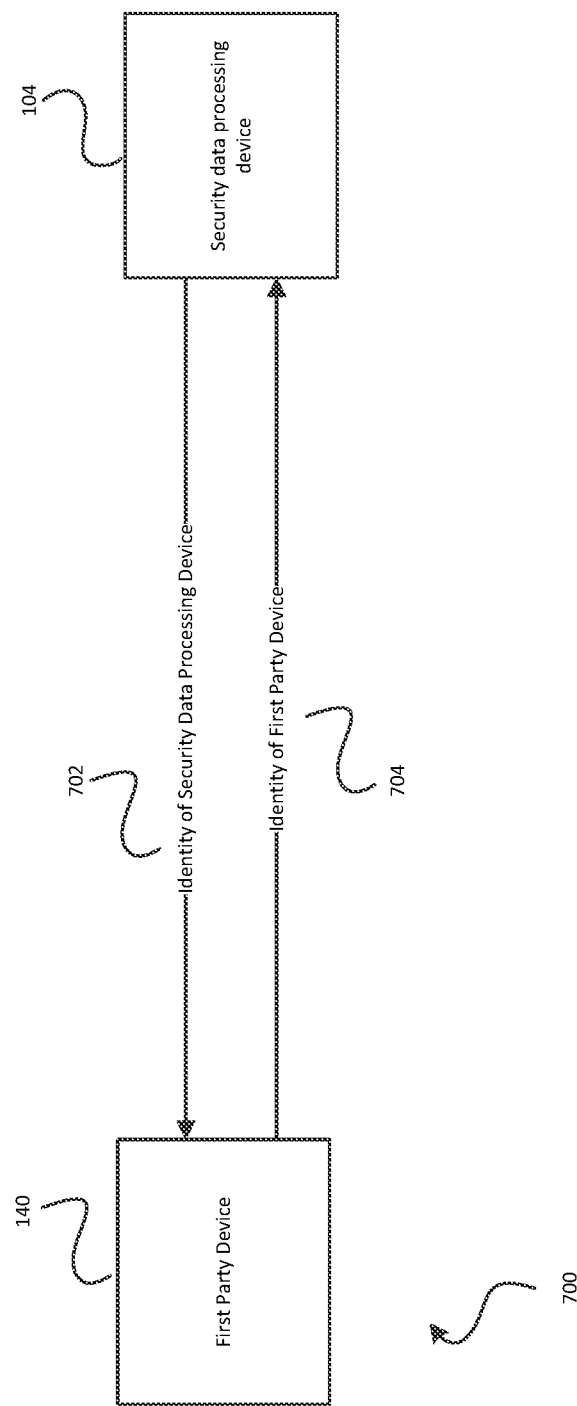
FIG. 7 shows a flow diagram of a registration procedure.

FIG. 7 shows a flow diagram (700) of a sub-contracting security data processing device registration procedure between first party device 140 and security data processing device 104. This process may occur prior to the methods of FIGS. 3 and 4. In step 704 the first party device 140 sends the identity of the first party device to the security data processing device 104. In step 702, security data processing device 104 sends the identity of the security data processing device 104 to the first party device 140. This may be referred to as a handshake between the first party device and the security data processing device. An aim of the process is to allow both devices to confirm that the other device exists.

In order to ensure the first party is acceptable for interacting with the security data processing device as described herein, the first party may be registered with the security data processing device prior to the commencement of sending the digital document to the security data processing device. This may be seen as a separate event where the two parties (i.e. the security data processing device and the first party) exchange signed information. In embodiments, the information required for registration is part of the digital document (e.g. in an Annex) from the security data processing device.

For example, in order to ensure an OEM is acceptable for subcontracting, the OEM is registered with a Subcontracting HSM prior to the contract flow. This may be seen as a separate event where the two parties exchange signed information. Alternately the HSM identity information may be delivered later as part of the contract (for example, in an Annex) from the HSM.

While the present disclosure has been particularly shown and described with reference to preferred embodiments, it will be understood to those skilled in the art that various changes in form and detail may be made without departing from the scope of the present disclosure as defined by the appendant claims.

What is claimed is:

1. A security data processing device comprising a processor and a memory coupled to the processor, the processor configured to:
    receive a digital document, said digital document comprising at least one primary programming requirement specified by a first party for programming at least one programmable device;
    determine if receipt of said digital document is an attempt to fulfil the same digital document more than once by determining if there is a record stored in the memory that corresponds to the digital document;
    receive a programming request from a programming module of a programming machine in communication with said processor, said programming request requesting the programming of the at least one programmable device;
    determine if the programming request complies with the at least one primary programming requirement in the digital document; and
    wherein in response to said programming request complying with the at least one primary programming requirement in the digital document and there being no record stored in the memory that corresponds to the digital document, the processor is further configured to:
    output programming information to the programming module for programming the at least one programmable device; and
    permanently store a further record in the memory, wherein the further record corresponds to said digital document.

2. The security data processing device of claim 1, wherein the digital document comprises one or more annex, wherein at least one of the one or more annex is specified by one of at least one further party and comprises at least one auxiliary programming requirement for programming the at least one programmable device.

3. The security data processing device of claim 1, wherein the processor is configured to:
    generate a programming report providing an indication of programming undertaken by said programming machine; and
    output said programming report.

4. The security data processing device of claim 3, wherein said processor is configured to output said programming report to one or more of:
    said programming module;
    said first party; and
    a database external to said security data processing device.

5. The security data processing device of claim 1, wherein one or more of said at least one programming requirement specifies where said programming report is output.

6. The security data processing device of claim 1, wherein at least one programming requirement specifies when a programming report is generated.

7. The security data processing device of claim 3, wherein said processor is configured to digitally sign the programming report.

8. The security data processing device of claim 1, wherein in response to said programming request failing to comply with the at least one primary programming requirement, the processor is configured to output an indication that the digital document has been rejected.

9. The security data processing device of claim 2, wherein in response to said programming request failing to comply with the at least one auxiliary programming requirement or the at least one primary programming requirement, the processor is configured to output an indication that the digital document has been rejected.

10. The security data processing device of claim 1, wherein in response to determining that there is a record stored in the memory that corresponds to the digital document, the processor is configured to transmit an indication that the digital document has been rejected to the first party.

11. The security data processing device of claim 3, wherein said processor is configured to generate said programming report comprising one or more of:
    an indication of a number of programmable devices programmed by the programming machine since either: a previously generated programming report was generated; or a start time specified by a programming requirement;
    a programming report time indicating a time that said programming report is generated; and
    a reference to, or indication of, said digital document.

12. The security data processing device of claim 1, wherein the processor is configured to:
    analyses each of the one or more annex independently; and
    determine if each of the one of more annex is in compliance with said programming request.

13. The security data processing device of claim 1, wherein the digital document is digitally signed by the first party.

14. The security data processing device of claim 1 wherein one or more of the at least one programming requirement comprises at least one of:
    a threshold number of times a cryptographic key stored in the memory can be used in a cryptographic operation;

a time period during which said programming machine is authorized to program said at least one programmable device;

a feature of said at least one programmable device which must be configured to be disabled; and a number of programmable devices that the programming module is authorized to program.

15. The security data processing device of claim 1, wherein said programming information comprises at least one of:

cryptographic information stored in said memory;

cryptographic information generated by said processor, optionally wherein said cryptographic information is generated in response to said processor receiving said programming request;

cryptographic information retrieved from said digital document by said processor, preferably information retrieved from one or more of the at least one annex; and an instruction for said programming machine to obtain cryptographic information from a data store in communication with said programming machine.

16. The security data processing device of claim 1, wherein said further record comprises at least one of:

one or more characteristics of said digital document; and a reference to a programmable device that has been programmed by said programming machine.

17. The security data processing device of claim 1, wherein at least one of said primary programming requirements comprises an indication of one or more security data processing devices that are allowed to output said programming information.

18. The security data processing device of claim 2, wherein at least one of said auxiliary and primary programming requirements comprises an indication of one or more security data processing devices that are allowed to output said programming information.

19. A method comprising:

receiving a digital document, said digital document comprising at least one primary programming requirement specified by the first party for programming at least one programmable device;

determining when receipt of said digital document is an attempt to fulfil the same digital document more than once by determining when there is a record stored in the memory that corresponds to the digital document;

receiving a programming request from a programming module of a programming machine in communication with said processor, said programming request requesting the programming of the at least one programmable device;

determining when the programming request complies with the at least one primary programming requirement in the digital document; and wherein in response to said programming request complying with the at least one primary programming requirement in the digital document and there being no record stored in the memory that corresponds to the digital document, the method further comprises:

outputting programming information to the programming module for programming the at least one programmable device; and permanently storing a further record in the memory, wherein the further record corresponds to said digital document.

20. A non-transitory computer-readable medium, the non-transitory computer-readable medium storing instructions that, when executed by a processor, cause the processor to:

receive a digital document, said digital document comprising at least one primary programming requirement specified by the first party for programming at least one programmable device;

determine if receipt of said digital document is an attempt to fulfil the same digital document more than once by determining if there is a record stored in the memory that corresponds to the digital document;

receive a programming request from a programming module of a programming machine in communication with said processor, said programming request requesting the programming of the at least one programmable device; and determine if the programming request complies with the at least one primary programming requirement in the digital document;

wherein in response to said programming request complying with the at least one primary programming requirement in the digital document and there being no record stored in the memory that corresponds to the digital document, the processor is further configured to:

output programming information to the programming module for programming the at least one programmable device; and permanently store a further record in the memory, wherein the further record corresponds to said digital document.

* * * * *

UNITED STATES PATENT AND TRADEMARK OFFICE
CERTIFICATE OF CORRECTION

PATENT NO. : 11,362,839 B2
APPLICATION NO. : 16/784468
DATED : June 14, 2022
INVENTOR(S) : Andrew Bott and Timothy John Woodruff It is certified that error appears in the above-identified patent and that said Letters Patent is hereby corrected as shown below:

On the Title Page

In the Foreign Application Priority Data Item (30) delete:
"Feb. 22, 2019 (GB) ...................1902469"
And insert:
-- Feb. 22, 2019 (GB) ................... 1902469.4 --.

Signed and Sealed this
Sixteenth Day of August, 2022

Katherine Kelly Vidal
*Director of the United States Patent and Trademark Office*